July 21, 1964 L. NAMENYI-KATZ 3,141,625

MAGNETIC TAPE RECORDER

Filed June 14, 1960 11 Sheets-Sheet 1

INVENTOR
LASZLO NAMENYI-KATZ
BY Imirie & Smiley
ATTORNEYS

July 21, 1964 L. NAMENYI-KATZ 3,141,625

MAGNETIC TAPE RECORDER

Filed June 14, 1960 11 Sheets-Sheet 2

INVENTOR
LASZLO NAMENYI-KATZ
BY Imirie & Smiley
ATTORNEYS

July 21, 1964 L. NAMENYI-KATZ 3,141,625

MAGNETIC TAPE RECORDER

Filed June 14, 1960 11 Sheets-Sheet 3

INVENTOR
LASZLO NAMENYI-KATZ
BY Imrie & Smiley
ATTORNEYS

July 21, 1964 L. NAMENYI-KATZ 3,141,625

MAGNETIC TAPE RECORDER

Filed June 14, 1960 11 Sheets-Sheet 4

INVENTOR
LASZLO NAMENYI-KATZ
BY Imirie & Smiley
ATTORNEYS

July 21, 1964 L. NAMENYI-KATZ 3,141,625

MAGNETIC TAPE RECORDER

Filed June 14, 1960 11 Sheets-Sheet 5

INVENTOR
LASZLO NAMENYI-KATZ
BY Imirie & Smiley
ATTORNEYS

INVENTOR
LASZLO NAMENYI-KATZ
BY [signature]
ATTORNEYS

July 21, 1964 L. NAMENYI-KATZ 3,141,625

MAGNETIC TAPE RECORDER

Filed June 14, 1960 11 Sheets-Sheet 7

INVENTOR

LASZLO NAMENYI-KATZ

BY Imirie & Smiley

ATTORNEYS

LASZLO NAMENYI-KATZ
INVENTOR

BY Irvine & Smiley
ATTORNEYS

July 21, 1964 L. NAMENYI-KATZ 3,141,625

MAGNETIC TAPE RECORDER

Filed June 14, 1960 11 Sheets-Sheet 9

INVENTOR

LASZLO NAMENYI-KATZ

BY Imirie & Smiley

ATTORNEYS

July 21, 1964 L. NAMENYI-KATZ 3,141,625

MAGNETIC TAPE RECORDER

Filed June 14, 1960 11 Sheets-Sheet 10

INVENTOR
LASZLO NAMENYI-KATZ
BY Imirie & Smiley
ATTORNEYS

July 21, 1964 L. NAMENYI-KATZ 3,141,625

MAGNETIC TAPE RECORDER

Filed June 14, 1960 11 Sheets-Sheet 11

INVENTOR
LASZLO NAMENYI-KATZ
BY Irwin & Smiley
ATTORNEYS

United States Patent Office 3,141,625
Patented July 21, 1964

3,141,625

MAGNETIC TAPE RECORDER

Laszlo Namenyi-Katz, London, England, assignor to Elliott Brothers (London) Limited, London, England, a British company Filed June 14, 1960, Ser. No. 36,030
Claims priority, application Great Britain June 18, 1959
5 Claims. (Cl. 242—55.12)

This invention relates to magnetic tape recorders, and it provides a recorder which is universally adaptable for a wide range of recording conditions and which is automatically set to required conditions for recording or playback by the mounting of a cassette containing the tape.

At present magnetic recording is usually carried out by the use of a tape consisting of a synthetic plastic or like base material coated on one face with a finely divided magnetic oxide. Recorders using such tape are commonly employed for the recording and reproducing of sound, such as speech and music, but they are being increasingly used for a wide range of research, instrumentation, industrial and other purposes.

To make a record the magnetic tape is moved past a recording head consisting of a magnetic circuit having a small gap and a winding on the magnetic circuit which is fed with the signals to be recorded, so that a varying magnetic field is set up across the gap which selectively magnetizes the magnetic coating of the tape as it passes the gap. To play back or "read" the tape the winding of the head is connected to the input of an amplifier and the passage of the tape past the head induces signal voltages in the winding which are a more or less faithful replica of the signal voltages applied during recording. To erase the recorded signals, the tape is traversed past the gap in a head supplied with direct or alternating erasing current. The magnetic heads used for recording, playback and erasure of recorded signals are basically similar, although they often vary in detail, and the term "magnetic head" will hereinafter be used to denote a head used for any or all of these purposes.

In recording speech or music, where the frequencies to be recorded extend through the audio range and an octave or two above that range, tape speeds of 7½ inches (about 19 cm.) or 3¾ inches (9½ cm.) per second are often employed and, where a more restricted frequency range is adequate, a speed of 1⅞ inches (4¾ cm.) per second is common. On the other hand, for instrumentation and research purposes it is frequently required to record very much higher frequencies, and to enable these frequencies to be efficiently recorded it is necessary to use higher tape speeds.

Standard tapes are supplied in varying widths For ordinary domestic recording it is usual to use a tape a quarter of an inch (about 6¼ millimetres) in width but for other purposes tapes of half-inch and one inch widths are commonly employed.

It is possible to make as many as forty separate recordings side by side on a tape one inch (about 25½ millimetres) in width and it is quite usual to record sixteen parallel tracks on a tape of this width.

A recording on a tape may be made directly, that is to say, by applying the frequencies to be recorded directly to the winding of the recording head. In other cases the signal to be recorded is first used to modulate a carrier and the modulated carrier is then recorded on the tape. This, of course, involves demodulation on playback. In such cases it is now usual to use frequency modulation.

It will be clear from the above notes that a universal recorder must provide for a very wide range of variations in recording conditions to cover all the possible requirements which may arise.

An important object of the invention is to provide a magnetic tape recorder which is universally adaptable to a very wide range of recording and playback conditions, in which the tape is carried in a cassette and the mounting of the cassette on the recorder automatically sets certain controls of the recorder to desired conditions, whereby manipulation is simplified and errors on the part of the person operating the apparatus are largely eliminated.

Another object is to provide a recorder containing several technical features which together constitute an advance in the art.

The invention consists of a universal magnetic tape recorder comprising mechanical means, electronic circuitry and switching to cover a wide range of recording and play-back conditions, a removable cassette in which the tape is carried, and control means in the recorder cooperating with adjustable means provided on the cassette to set the recorder automatically to predetermined recording or playback conditions when the cassette is mounted on the recorder.

Preferably two capstan drives and two tape spool drives are separate mechanical units each driven by its own motor, the units being controlled and caused to cooperate by electrical means.

Conveniently the cassette comprises a housing containing two rotatable hub members to carry tape spools each supported on its own bearing in the housing, a plurality of groups of tapped holes in the housing, the adjustable means comprising screws each of which can be screwed into any one of one group of tapped holes, the screw projecting from the rear face of the cassette and engaging push switches when the cassette is mounted on the recorder, each group of tapped holes covering one variable recording or play-back condition.

According to a feature of the invention each tape spool drive may comprise a spindle adapted to drive one of the spool hubs in the cassette, an electromagnetic clutch of the type in which the torque transmitted is proportional to the current through the clutch connected to the spindle, a motor to drive the clutch, and means to vary the current passing through the clutch in inverse proportion to the speed of the spindle. The means to vary the current in the clutch may comprise a disk mounted on the spindle having a series of apertures, a lamp on one side of the disk and a photo-electric device on the other side of the disk arranged so that the photo-electric device delivers a signal having a frequency proportional to the spindle speed, an integrating circuit coupled to the photo-electric device to generate a voltage which is proportional to the frequency, and an inverting circuit which provides an output inversely proportional to the frequency. There may be an electromagnetic brake comprising a winding, a magnetic core including two movable arms adapted to press against the two faces of the disk, and a spring to urge the arms away from the disk, whereby the passage of a heavy current through the winding causes the arms to move into contact with the respective sides of the disk to apply a friction brake to the disk.

According to another feature of the invention each capstan may be associated with a pinch roller adapted to be moved laterally into and out of engagement with the capstan and also to be moved axially into and out of its operative relationship with the capstan.

In accordance with a further feature of the invention there may be a support adapted to carry a plurality of magnetic heads mounted in a line, a pressure pad member adapted to be moved into and out of operative relationship with the magnetic heads, the pressure pad member having two end support portions spaced by a distance exceeding the length of the line of magnetic heads and a number of intermediate support portions equal to one less than the number of magnetic heads spaced between the two end support portions, a flexible ribbon anchored to the pressure pad member and slidably supported by all the support portions, and a pad of soft material attached to each part of the ribbon between adjacent support portions adapted in the operative position of the pressure pad member to press the tape against one of the magnetic heads to retain the tape in operative relation thereto.

To facilitate a clear understanding of the invention an embodiment thereof will now be described, by way of example, with reference to the accompanying drawings in which—

Figure 1:
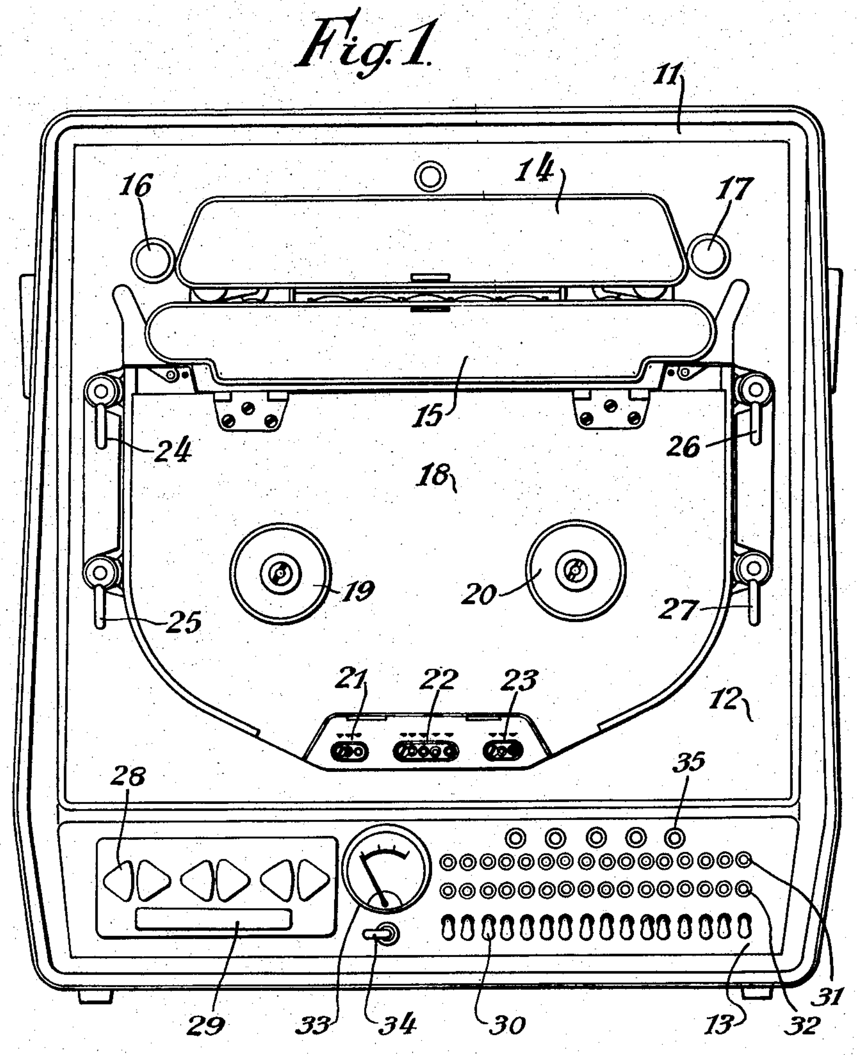
FIGURE 1 is a front elevation of a complete magnetic tape recorder showing the tape cassette in position.

Referring to the drawings, the magnetic tape recorder comprises a housing 11 of generally rectangular form standing on feet and supporting a vertical deck plate 12 which carries the recording apparatus and a tape cassette. A control panel 13, which carries the main recorder controls, is mounted on the lower part of the housing.

The deck plate 12 is provided with two covers 14 and 15, which enclose the capstan mechanisms and the magnetic heads, and two press buttons 16 and 17 by means of which the respective capstans may be brought into their operative positions. The heads and the capstan mechanisms will be referred to in more detail later.

The deck plate 12 also contains mountings for a cassette 18 having two hub members 19 and 20 adapted to carry tape spools. The cassette includes its own front cover (not shown) and also contains three small panels respectively 21, 22 and 23, containing adjusting means which are adapted to co-operate with switches carried in the recorder behind the cassette, by which desired recording conditions may be pre-set on the cassette.

The cassette is adapted to be readily mounted upon or removed from the recorder. It is automatically located in its correct position and is retained by means of four quick-acting cam locks 24, 25, 26 and 27 engaging lugs formed on the cassette housing.

The control panel 13 contains three pairs of push buttons 28, to provide for various recording conditions and a stop bar 29.

The two buttons 28 of each pair are shaped like arrow heads and point in opposite directions. The first pair provides for recording with the tape moving in either direction, as indicated by the direction of the button, the second pair provides for playback with the tape moving in either direction, while the third pair provides for fast spooling in either direction. A row of switches 30, sixteen in number, provide for individual control of the sixteen elements of the multiple track magnetic heads in the recorder and two rows, 31 and 32, of signal lamps provide an indication of certain conditions which will be referred to in more detail later. By means of the switches 30 individual elements in the multiple track head may be selected for erasure and re-recording of individual tracks on the tape without disturbing the matter recorded on the other tracks. Indicator lamps 35 show the tape speed to which the recorder is set.

An indicating meter 33 indicates the recording level and/or supply voltage and a switch 34 may be used to control the supply or, in particular applications, to switch from direct to frequency-modulated recording.

Having considered the general layout of the recorder, the individual parts thereof will now be described in greater detail.

*The Cassette*

Figures 2, 3, 4:
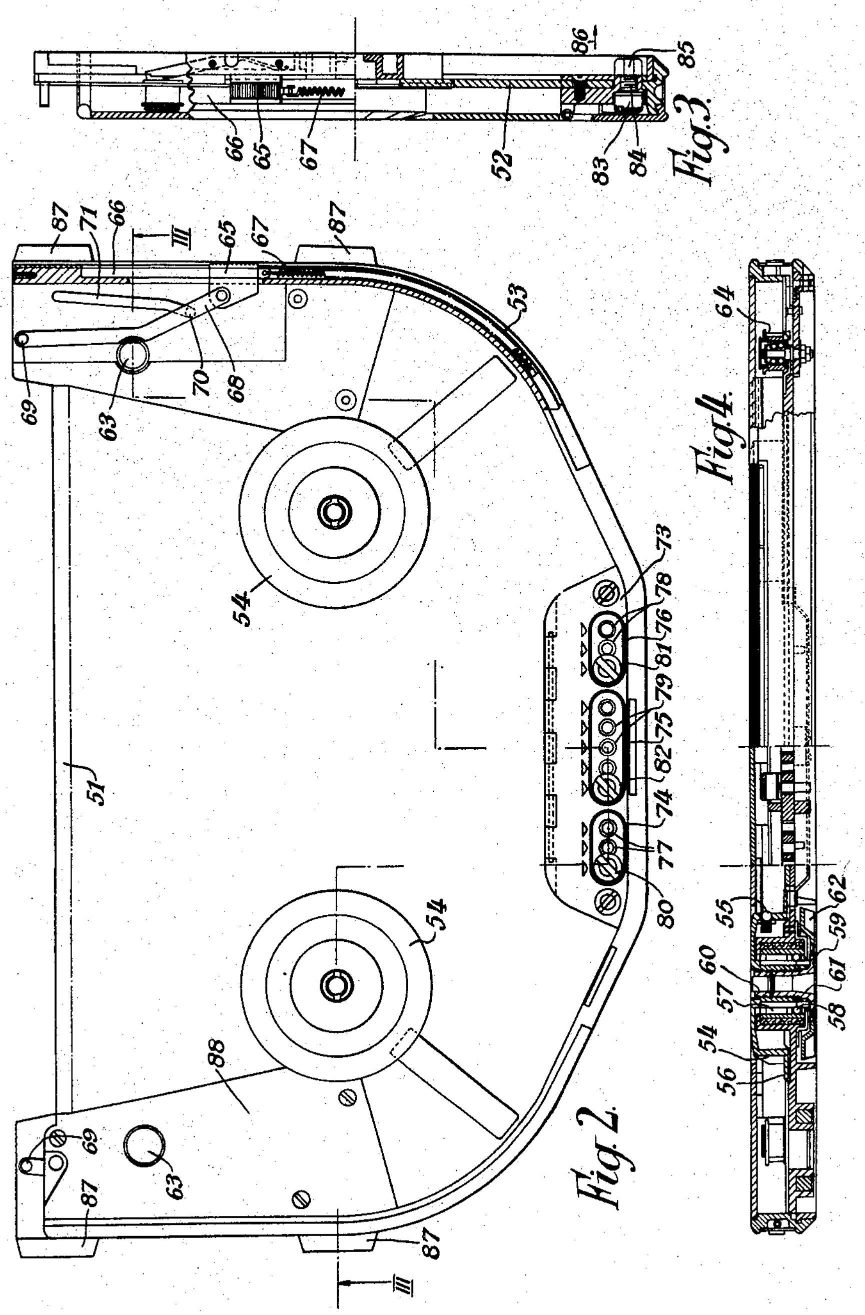
FIGURE 2 is a front elevation of the removable cassette.
FIGURE 3 is a side elevation, partly in section, of the cassette of FIGURE 2.
FIGURE 4 is a sectional plan view on the line IV—IV of FIGURE 2.

The cassette is shown in FIGURES 2, 3 and 4 and consists of a housing 51, which may conveniently be in the form of a moulding in a synthetic plastic material, the housing including a back plate 52 and an upstanding rim 53. A cover consisting of a transparent sheet is not shown. At appropriate points two rotatable hub members 54 are provided (only one of which is shown in FIGURE 4) having an outer diameter of a size to suit the internal diameters of the spools to be used, and including retaining means, such as the spring-loaded ball 55, to retain a spool in position. As shown, the hub member 54 has a rear flange 56 against which the spool rests when in position. Each hub member 54 is carried on a roller bearing 57 and is axially located by a ball bearing 58. The hub member 54 contains an inner sleeve 59 having a through bore 60 with a tapered portion 61 at the rear of the cassette, the tapered portion being adapted to engage with a corresponding tapered drive spindle on the recorder. Integral with the sleeve 59 is a disk-like portion formed with a ring of depressions 62 adapted to engage corresponding teeth on a member fixed to the drive spindle of the recorder. Both hub members 54 are of identical construction.

Two guide rollers 63 are mounted on bearings carried on the cassette and each guide roller is provided with a single flange 64 adapted to guide the inner edge of the tape. These guide rollers co-operate with further guide rollers on the recorder, each of which incorporates a single flange to guide the outer edge of the tape.

At each side of the cassette is a device to facilitate loading of the cassette in the recorder. These are normally hidden behind plates 88, but the right-hand plate has been removed in FIGURE 4. Assuming that a full spool of tape and an empty spool have been placed on the two hub members 54 and the end of the tape from the full spool has been secured to the empty spool, the tape is passed over the two guide rollers 63. A sliding member 65 is provided at each side of the cassette and is adapted to slide up and down in a groove 66, being urged to the downward position by a spring 67. The member 65 has one end of an arm 68 pivoted to it, the arm 68 having a small roller 69 fixed to its other end and having a second roller 70 located at an intermediate point, which is engaged in a slot 71 in the back plate of the housing of the cassette. Normally each member 65 is retained in its lower position by its spring 67, when each arm 68 is in the position shown in FIGURE 2.

The tape is also passed round the rollers 69. When the members 65 are raised to their full extent two catches (not shown) are engaged to hold them in that position. As the arms 68 rise they also move outwardly due to the direction of the slot 71. When the arms 68 are raised the tape is lifted into an upper position such that when the cassette is placed on the recorder the line of the tape between the two rollers 69 is at the correct level to allow the tape to slide over further guide rollers and into the spaces between the magnetic heads and pressure pads, and the pinch rollers and capstans. After the cassette has been placed in position the catches are released so that the members 65 are moved back to their original positions.

At the lower end of the cassette is a panel 73 provided with three depressions, respectively 74, 75 and 76, the depression 74 containing a group of three tapped holes 77, the depression 76 containing another group of three tapped holes 78 and the depression 75 containing a group of five tapped holes 79. A screw 80 is adapted to be screwed into any one of the three tapped holes 77, a screw 81 is adapted to be screwed into any one of the three tapped holes 78 and a screw 82 is adapted to be screwed into any of the five tapped holes 79. These screws are all of the same shape and consist of a head 83, a threaded portion 84 and a parallel portion 85 beyond the threaded portion 84, but the threads are different, so that each screw may only be screwed into one of the group of tapped holes for which it is intended and it is impossible for two screws to be screwed into holes in the same group. The parallel portions 85 project beyond the back plate of the cassette and are adapted to engage a series of sliding wafer switches in the recorder and to move them when the cassette is pushed into position on the recorder in the direction of the arrow 86. The screw 80, when screwed into the tapped holes 77 will set the recorder for frequency modulated recording, direct recording or playback. Accordingly, this screw, when placed in either of the first two positions will enable a recording of the appropriate type to be made when the cassette is in position on the recorder. After the recording has been made the screw is moved to the third position and when the cassette is at any future time placed on the recorder it will automatically inhibit the setting of control circuits in the recorder to the record condition, thereby automatically preventing the accidental erasure of a previously recorded passage on the tape, and the recording of new matter in its place.

The setting of the screw 81 controls the direction of rotation of the two capstans placed respectively on the two sides of the magnetic head or heads. With the screw in the left-hand position the two capstans both rotate to move the tape from right to left. In the right-hand position the two capstans both rotate to move the tape from left to right. In the central position the two capstans are set to rotate in opposite directions so that by engaging one of the pinch rollers associated with the capstans while the other is disengaged the tape may be moved in one direction, and the tape direction may be reversed by disengaging the one pinch roller and engaging the other.

By means of the screw 82 the tape speed for recording and playback is set. The five speeds may, for example, be 1⅞, 3¾, 7½, 15 and 30 inches per second.

The framework of the cassette may be clamped to the recorder by any suitable means, for example, lugs 87 on the sides which are engaged by quick-acting cam locks on the recorder casing.

*The Tape Spool Drive*

Figure 5:
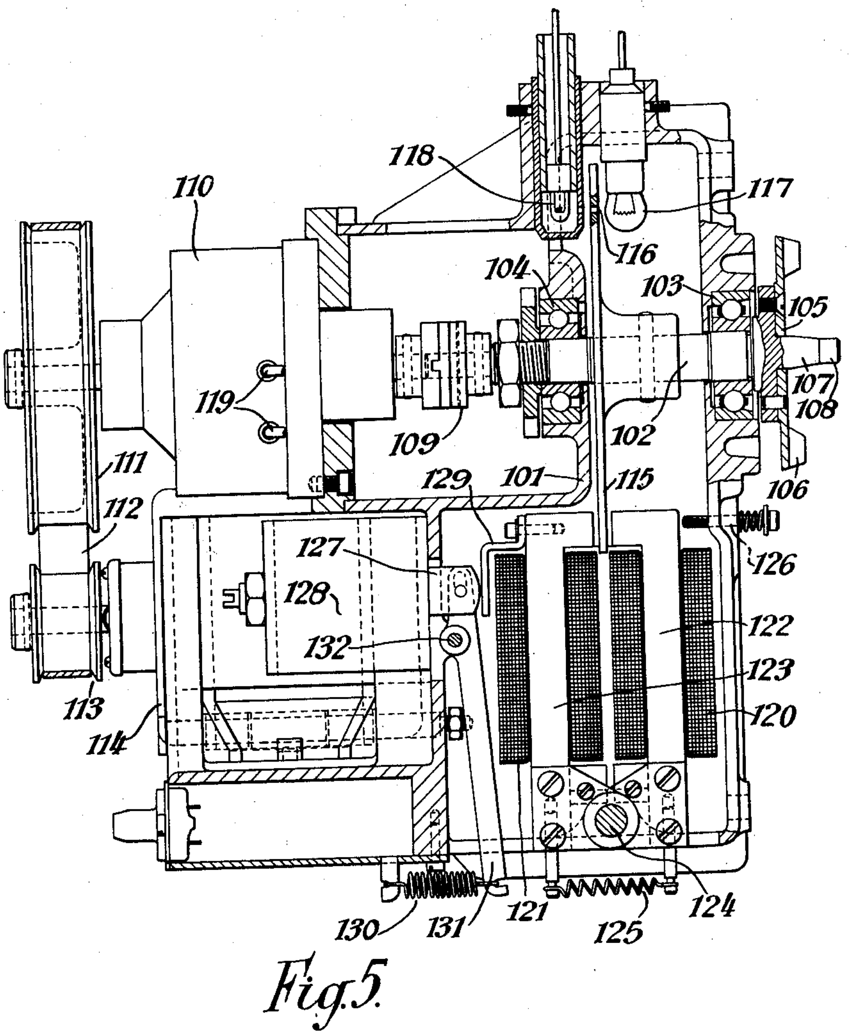
FIGURE 5 is a sectional elevation of one of the tape spool drive units.
Figure 6:
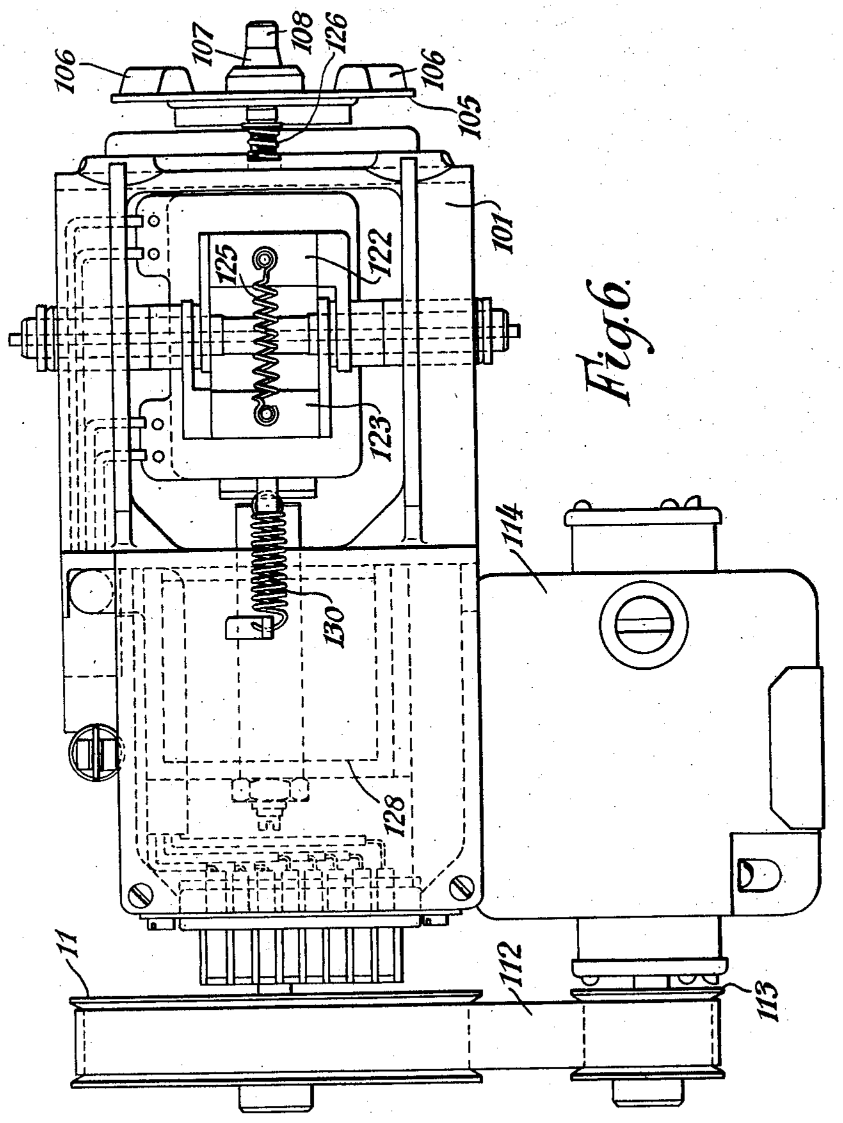
FIGURE 6 is a plan view of the unit of FIGURE 5.
Figure 7:
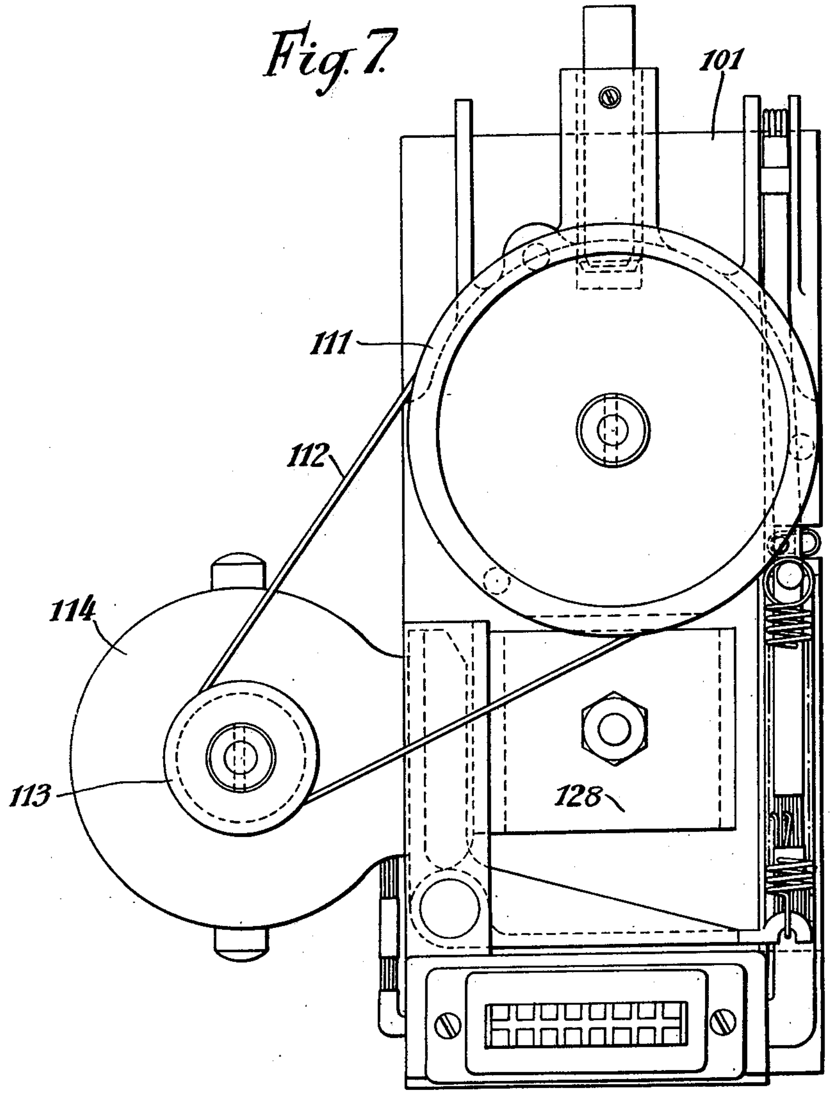
FIGURE 7 is a rear end elevation of the unit of FIGURE 5.

Two tape spool drives are provided. One of them is shown in FIGURES 5, 6 and 7. The other is identical except that the layout is reversed from left to right, so that the two drives will fit side by side into the recorder.

Referring to the drawings, the drive is assembled on a framework 101 which may be built up of several parts and is adapted to be mounted on the deck plate 12 of the recorder. A spindle 102 is supported in ball bearings 103 and 104 in the framework and has a coupling member 105 mounted on its outer end, the coupling member containing teeth 106 adapted to engage the recesses 62 in the respective hub member of the cassette. The outer part of the spindle 102 is formed with a tapered portion 107, mating with the tapered portion 61, and a short parallel portion 108 at its end which fits into the bore 60 of the hub member.

The inner end of the spindle 102 is connected through a coupling 109 to the output shaft of a magnetic particle clutch 110 and the input shaft of the latter is furnished with a pulley 111 which is coupled by a belt 112 to a pulley 113 mounted on the shaft of a motor 114.

The magnetic particle clutch is, in itself, a well known device. Its feature is that the torque which it will transmit without slipping varies in a linear manner with the current passing through its winding and the performance is maintained with a very high degree of consistency.

Assuming that a cassette is in position, that a full spool of tape has been mounted on one of the hub members and an empty spool has been mounted on the other hub member, the free end of the tape from the full spool being anchored to the hub of the empty spool, it will be evident that to traverse the tape at a constant speed from the feed spool (the full spool) to the take-up spool (the empty spool), the take-up spool must initially run at a relatively high speed while the feed spool runs at a low speed, since the tape is being led from a large diameter to a smaller diameter. As the tape is transferred from the one spool to the other the take-up spool gradually slows down as the diameter of the coil of tape wound upon it increases while the speed of the feed spool progressively increases as the diameter of its coil of tape decreases.

It is important that the tape should be fed to the capstans at substantially the correct speed so that no appreciable advancing or retarding torque is applied to the capstans, since such a torque could affect the precision with which their speed is controlled. It is also important that the tape tension should be maintained substantially constant. While the speed of the take-up spool must diminish as the diameter of the coil of tape increases, the torque applied to the spool must increase with the diameter in order to maintain a constant tape tension, the relationships between diameter, speed and torque being linear. The spool drive provides for these variations automatically in the following manner.

The pulley 111 is constantly driven at a speed above the highest speed at which the spindle 102 is required to run. A metal disk 115 is mounted on the spindle 102 between the bearings 103 and 104. The disk 115 is formed with a ring of small holes 116. A lamp 117 is placed on one side of the disk and a photo-electric element 118, such as a photo-transistor, is placed on the other side of the disk, in such a manner that light from the lamp passes through the holes 116 and strikes the photo-electric element 118. As the disk 115 rotates a series of light flashes from the lamp 117 is applied to the photo-electric element 118 which produces a series of electrical impulses whose frequency varies directly with the speed of rotation of the disk 115, and hence of the spindle 102. These impulses are amplified and applied to a known type of electronic integrating device to produce an output in the form of a voltage which varies directly with frequency. Thus, assuming that the spindle 102 is driving a tape take-up spool which is initially empty, the spool rotates initially at a high speed and gradually slows down. In consequence, the integrating device produces an output voltage which is initially high but gradually falls as the spool speed diminishes. This voltage is applied to a further piece of electronic circuitry of known type which inverts the variation linearly, i.e. it produces a high output voltage for a low input voltage and a low output voltage for a high input voltage. The output of the latter device is applied to the magnetic particle clutch 110 through the input leads 119. When the speed of the spindle 102 is high the output of the integrating device is high and the output of the inverting device is low, so that the current supplied to the magnetic particle clutch is low and the torque transmitted to the spindle 102 is low. As tape is fed on to the spool the diameter of the coil wound thereon progressively increases and the speed of the spool, and of the disk 115, decreases so that the frequency of the impulses generated by the photo-electric element 118 falls. This causes a fall in the output of the integrating device and a corresponding increase in the output voltage of the inverting device which increases the current supplied to the magnetic particle clutch 110. The clutch thus transmits a progressively increasing torque to the spool driven by the spindle 102 as its speed decreases, in order to maintain a constant pull on the tape. The control associated with the other tape spool (the feed spool) acts in the opposite way since it is progressively increasing its speed.

The disk 115 serves another purpose. Two solenoids 120 and 121 (which together form a single winding) are respectively mounted on magnetic cores 122 and 123, the inner ends of which are turned inwardly so that they face each other, leaving a gap in which the disk 115 runs. The coils are wound to produce flux in opposite directions in the two movable cores so that the core ends facing the gap will attract one another on passage of current through the coils. The two cores 122 and 123 form arms which are pivoted on a pivot 124 and their outer ends are drawn together by a spring 125. The pull of the spring 125 thus holds the ends of the arms 122 and 123 apart to make the gap in which the disk 115 runs as wide as possible. The outward movement of the arm 122 is limited by an adjustable stop screw 126.

In addition to the spring 125, the arm 213 is also acted upon by an armature 127 associated with a solenoid 128 mounted on the framework through the medium of a member 129 attached to the arm 123. A spring 130 has one end anchored to the framework and is connected at its other end to a lever 131 pivoted at a point 132 which is linked to the armature 127 at its other end.

When the recorder is running the solenoid 128 is energized so that the armature 127 is held inwardly and out of contact with the member 129. The ends of the arms 122 and 123 are kept apart by the spring 125. When the recorder is to be stopped the solenoids 120 and 121 are energized so that the inner ends of the arms 122 and 123 are drawn towards each other and make contact with the disk 115 to apply a frictional braking force. The ends of the arms 122 and 123 are faced with friction material for this purpose. If there should be a power failure while the recorder is running at high speed, the take-up spool will automatically be stopped because the capstans will stop but the feed spool would normally continue under its own momentum and would discharge a large amount of loose tape before stopping. This is prevented in the construction being described because a power failure leads to de-energization of the solenoid 128 and this allows the armature 127 to move outwardly under the influence of the spring 130 and, through the member 129, to press the arm 123 into frictional contact with the disk 115 to stop it. Thus automatic stoppage of both spools is provided for in case of power failure or when switching off.

The disk 115 may serve still another purpose. Since the spindle 102 is mounted on ball bearings very little torque is required to drive the feed spool. Consequently, due to its own momentum, especially when full of tape, the spool may easily over-run and "throw" a loose loop of tape. By applying a current to the solenoids 120, 121 which is not sufficiently large to cause the arms 122 and 123 to move into contact with the disk 115, eddy currents are induced in the disk and a light braking torque is applied to the feed spool to ensure that there is a predetermined tension on the tape as it is fed to the capstans. Since the current through the solenoids 120, 121 is now insufficient to pull the arms 122 and 123 inwardly against the pull of the spring 125 no direct friction braking torque is applied to the disk 115. It is a relatively easy matter so to adjust the circuit constants of the two spool drives that the take-up spool always applies a predetermined pull to the tape while the feed spool applies an equal drag, so that the tape tension before and behind the capstans is substantially equal, while the tape is fed to and from the capstans at exactly the required speed. This part of the invention solves, simply and effectively, what is usually an acute problem in instrumentation tape recorders.

*The Capstan Drive*

Figure 9:
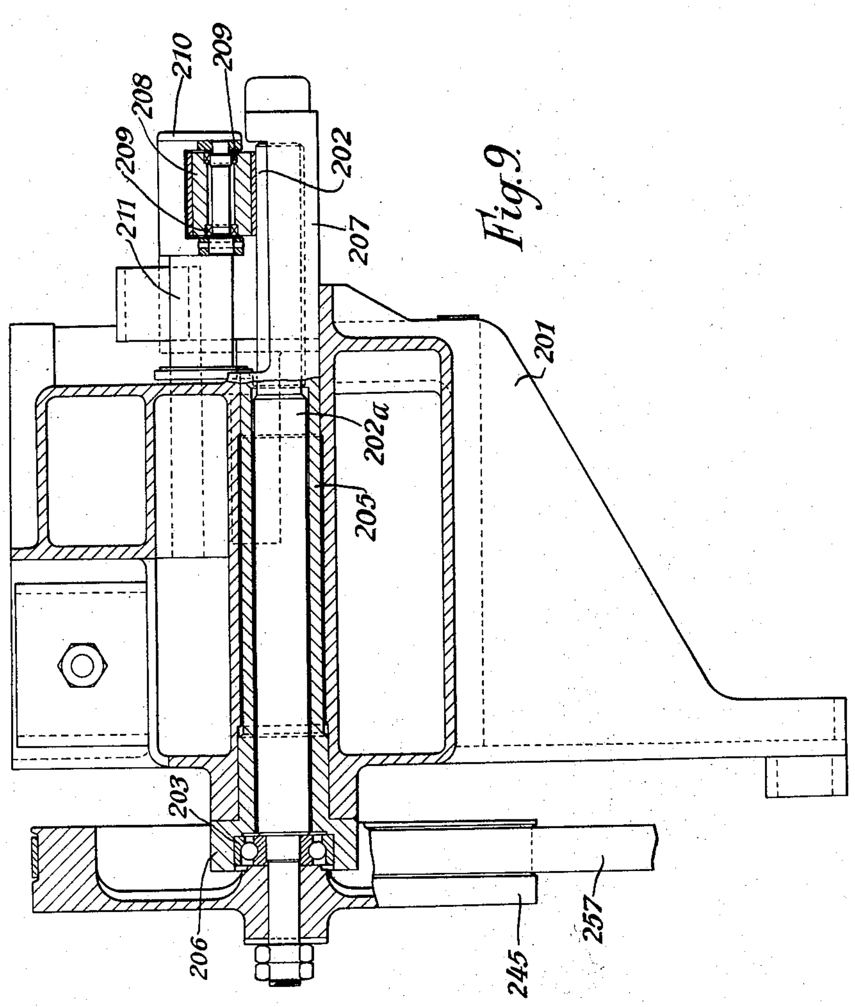
FIGURE 9 is an elevation of one side of the unit of FIGURE 8.
Figure 10:
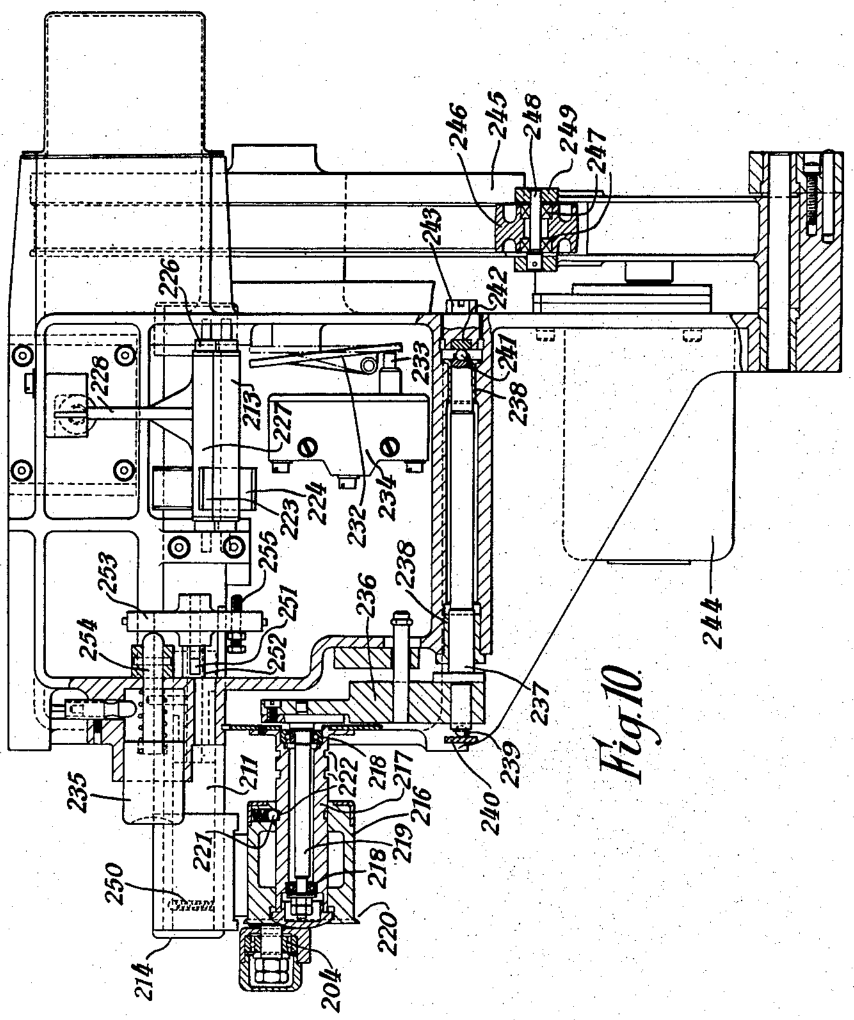
FIGURE 10 is an elevation, partly in section, of the other side of the unit of FIGURE 8.

There are two capstan drives mounted near the top right and top left corners of the recorder. They are identical except that one is reversed from left to right with respect to the other. One of them is shown in FIGURES 8, 9 and 10.

The capstan drive is carried in a framework 201 which is adapted for mounting on the deck plate of the recorder. The framework may be built up of several convenient sections assembled together. The capstan 202, with an integral shaft 202*a*, is carried on an inboard ball bearing 203 at one end and an outboard ball bearing 204 contained in the end of a sleeve 205 which extends over the whole length of the capstan and shaft, and has a flange 206 at its inner end which butts against a face of the framework 201, the sleeve 205 being diametrally located therein at its front and rear ends. The outer portion 207 of the sleeve 205 is cut away at the top to expose the capstan while the remaining part forms a shroud around most of its periphery to protect it from accidental damage. A pinch roller 208, having a peripheral facing of resilient material, is carried in two bearings 209 mounted in a swinging member 210 which is carried on a shaft 211 mounted parallel to the capstan in the framework 201. The shaft 211 is slidable axially in the framework 201 and is also rotatable through a limited arc to swing the pinch roller laterally into and out of engagement with the capstan.

For swinging the pinch roller 208 into and out of engagement with the capstan 202 a forked member consisting of two flat springs 223 and 224 (shown dotted in FIGURE 8) is secured to a collar 225 (also shown dotted) on the shaft 211. The forked member is engaged by a horizontal bar 213 carried on a frame 226 integral with a sleeve 227 pivoted on the framework 201. An arm 228 attached to the sleeve 227 is linked to the armature 229 of a solenoid 230 also attached to the framework 201. A tension spring 231 urges the solenoid armature to its outer position.

Figure 8:
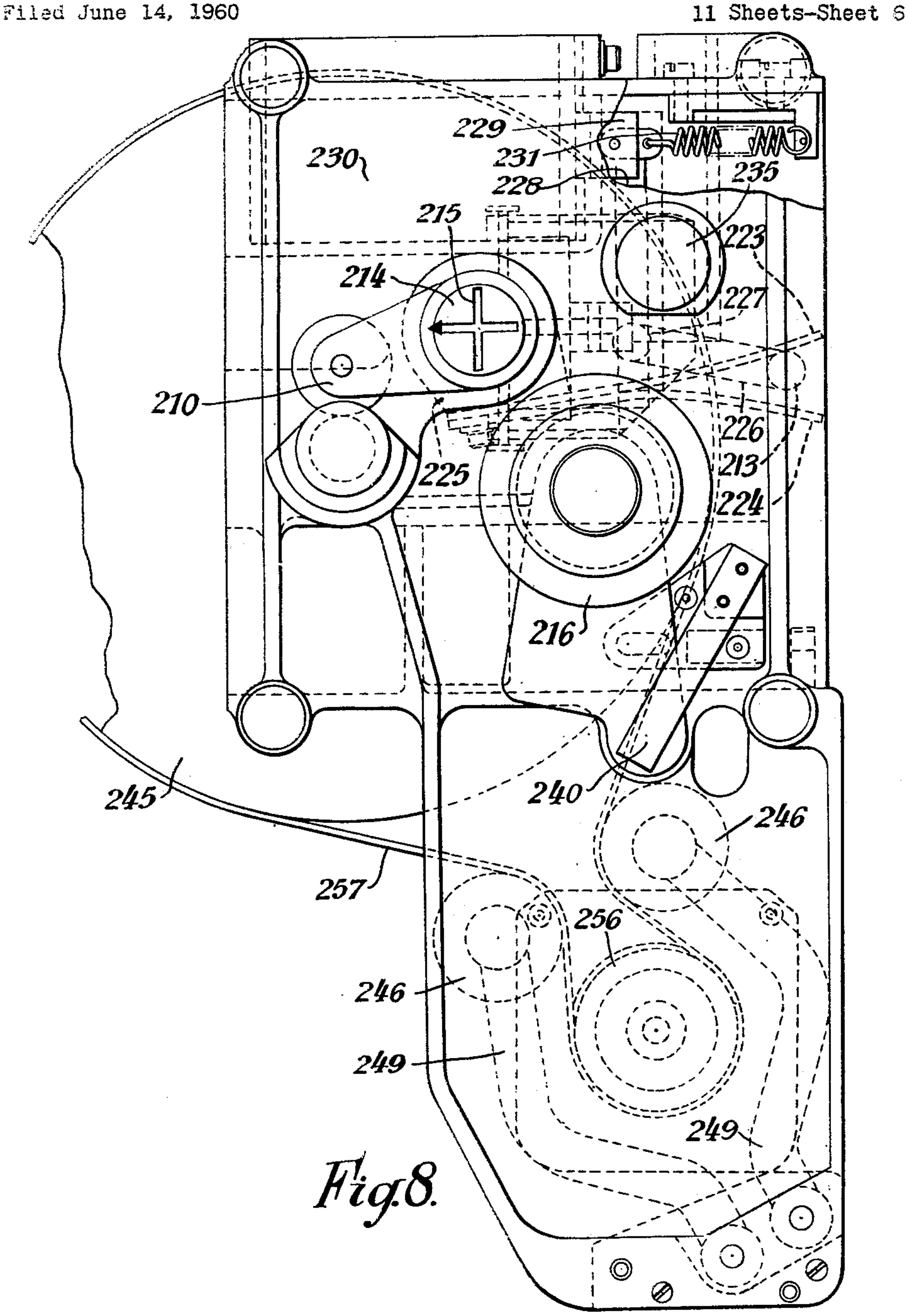
FIGURE 8 is a front elevation of one of the capstan drive units.

When the solenoid 230 is energized the armature 229 is pulled inwardly against the tension of the spring 231 and moves the arm 228 anti-clockwise in FIGURE 8. This causes the rod 213 to be moved in the anti-clockwise direction about the axis of the sleeve 227 into the position shown in FIGURE 8, thus rotating the shaft 211 in the anti-clockwise direction and bringing the pinch roller 208 into contact with the capstan 202. The flat spring 223 is flexed to some degree during the movement of the rod 213 and thus applies appropriate spring pressure to the pinch roller.

The pinch roller may be moved axially out of operative relationship with the capstan by pushing the end of the shaft 211 inwardly against a spring (not shown) until the shaft is held in the retracted position by a latch which engages a rotatable member 214 carried in an axial bore in the shaft 211.

The member 214 is provided with a cruciform slot 215 by which it may be rotated. A spring loaded ball detent 250 carried in the member 214 may engage in any one of four depressions placed so that the member 214 may be rotationally set to any one of four equally spaced positions. The member 214 is provided part-way along its length with a deep circumferential groove bounded, at its inner side by a shoulder which, when the shaft 211 is fully retracted, is engaged by the spring controlled latch 251 which projects into the bore in the shaft 211 through a slot 252. Three grooves extend longitudinally along the member 214 from the shoulder. These grooves are spaced at 90° intervals around the member 214, they are not so deep as the circumferential groove and they are of different lengths. They are so positioned that in three of the positions of the member 214, the latch 251 is in line with one of the grooves. Assuming that the member 214 is in one of these positions, pressure on a push button 235 (which is one of the buttons 16 and 17 of FIGURE 1) releases the latch from the shoulder. The movement of the latch is, however, limited so that while it disengages the shoulder it is still within the groove. The shaft 211 moves outwardly until the latch engages the end of the groove. The mechanism is so arranged that in the three positions of the member 214 the shaft 211 is allowed to move out to positions in which the pinch roller is correctly positioned for quarter-inch, half-inch and one inch wide tapes, while in the fourth position, there being no groove, pressure on the button 235 has no effect.

The latch 251 rocks about the axis of a spindle 253 and the push button 235 acts on an arm attached to the spindle through a stem 254. A stop screw and lock nut 255 enable the movement of the latch to be adjusted.

A guide roller 216 is carried on a sleeve 217 rotatable on two ball bearings 218 supported on a fixed stem 219. The guide roller has a single outer flange 220 which engages the outer edge of the tape and guides the said edge. The inner edge of the tape is guided by the flange of the guide roller 63 carried on the cassette. The guide roller 216 contains a spring loaded ball 221 which is adapted to engage in one of three grooves 222 in the sleeve 217. Thus the guide roller 216 may be moved axially into and retained in any of three positions which are appropriate for one-quarter, one-half and one inch wide tapes.

The stem 219 is carried on an arm 236 attached to a shaft 237 supported in bearings 238 in the framework. The outer end of the shaft 237 is fitted with a ball 239 which is engaged by a leaf spring 240. The spring 240 applies axial pressure to the shaft 237 tending to move it inwardly. The inner end of the shaft 237 is provided with a further ball 241 which bears against a hardened pad 242 in the end of an adjusting screw 243. By operating the adjusting screw 243, the position of the flange 220 with respect to the capstan, the recording heads and other important parts of the recorder may be adjusted.

The arm 236 is acted upon by a spring 259 (of which only the hooked end is seen) through a peg 260 fixed to the arm 236. The spring 259 urges the arm 236 in the direction in which tension is applied to the tape by the guide roller 216.

The capstan is driven by a synchronous motor 244 through the medium of a pulley 256, a belt 257 and a further pulley 245 mounted on the capstan shaft, the latter being formed with a heavy rim so that it also acts as a fly-wheel. The belt is maintained in a taut condition by means of two jockey pulleys 246 carried on bearings 247 supported on pins 248 in swinging arms 249.

*The Magnetic Head and Pressure Pad Assembly*

This is mounted on the central, upper portion of the deck plate 12 and is shown in FIGURES 11, 12, 13 and 14.

Referring to these figures, the assembly comprises a support 301 upon which five magnetic heads, respectively 302, 303, 304, 305 and 306 are carried. Each of the heads 302 to 306 is a multiple-track head. Each head consists of 16 separate elements mounted side by side, so that it will record on 16 parallel tracks along the tape. Electrical connections to the elements of each head are made by means of tags 307 projecting from the bottom of each head. The individual heads are mounted in sub-frames 309 in the framework by means of downwardly projecting portions 308 and clamping screws 313 provided with clamping members 314.

The heads are of a kind in which the gaps of all the elements are in a straight line and the sub-frames 309 are rotatable to a limited extent about vertical axes to permit adjustment whereby this line may be set truly transverse to the line of the tape. For this purpose each sub-frame 309 has a projecting lug 310 engaged by two nuts 311 which can be screwed in either direction along a horizontal threaded rod 312.

A pressure pad member 315 is hinged on a rod 316 to the framework 301. It includes two end support portions 317 and 318, spaced by a distance which exceeds the overall length of the line of heads 302 to 306, and four intermediate support portions, respectively 319, 320, 321 and 322. A ribbon 323, which is preferably a metal ribbon, is anchored at its ends to convenient points and is slidably supported by each of the support portions 317, 318, 319, 320, 321 and 322. Attached to the ribbon 323 between each of the support portions is a pad 324 of soft material, which may conveniently be nylon velvet.

Figure 11:
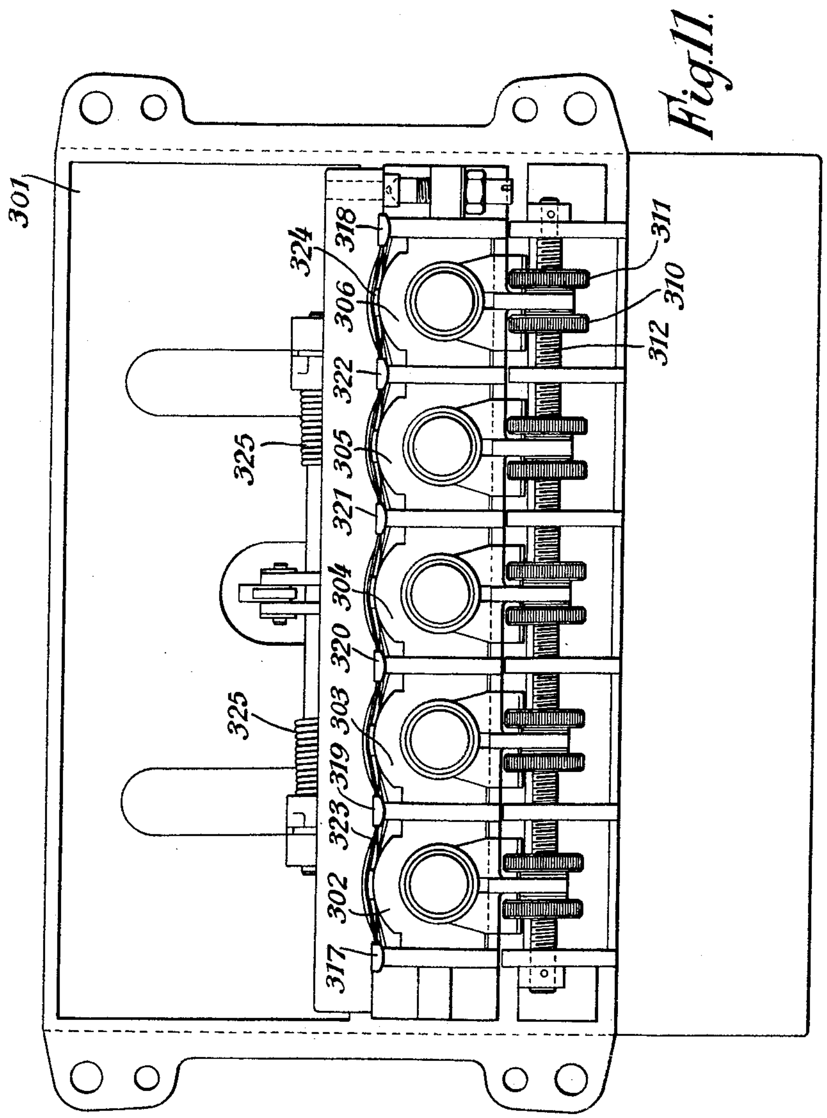
FIGURE 11 is a front elevation of the magnetic head and pressure pad assembly.
Figure 12:
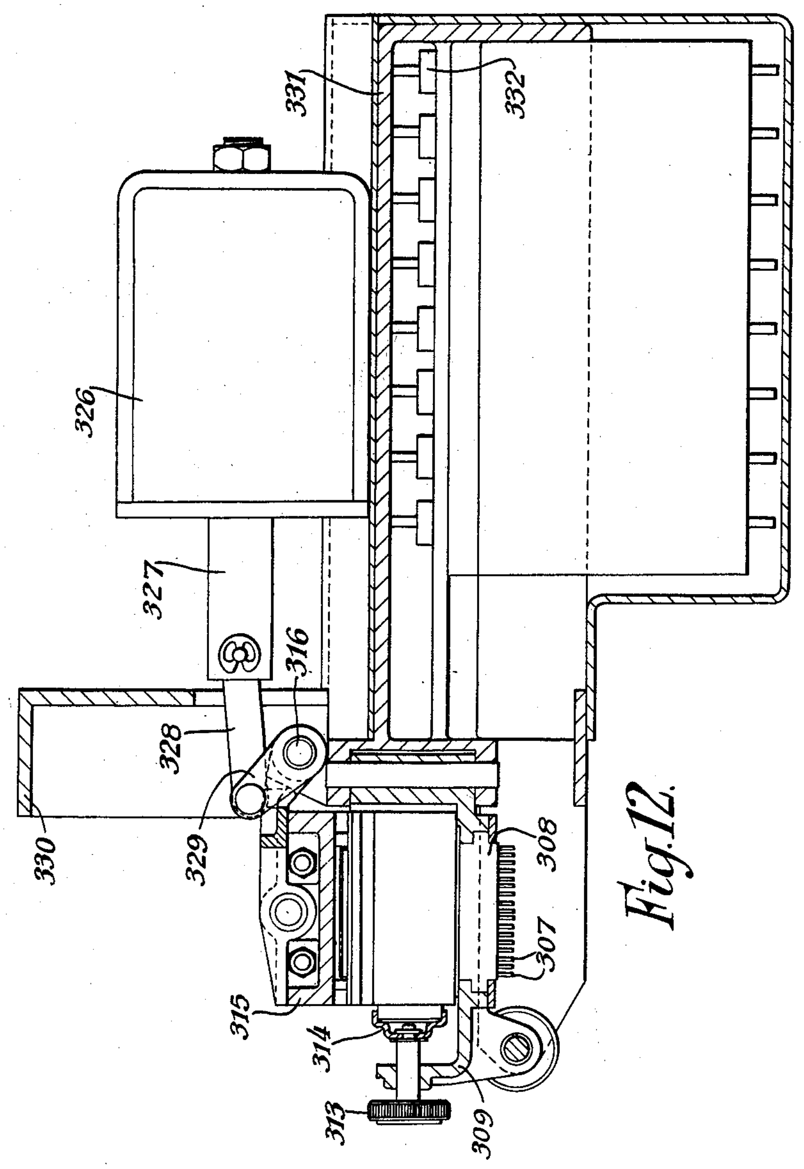
FIGURE 12 is a side elevation, partly in section, of the unit of FIGURE 11.
Figure 13:
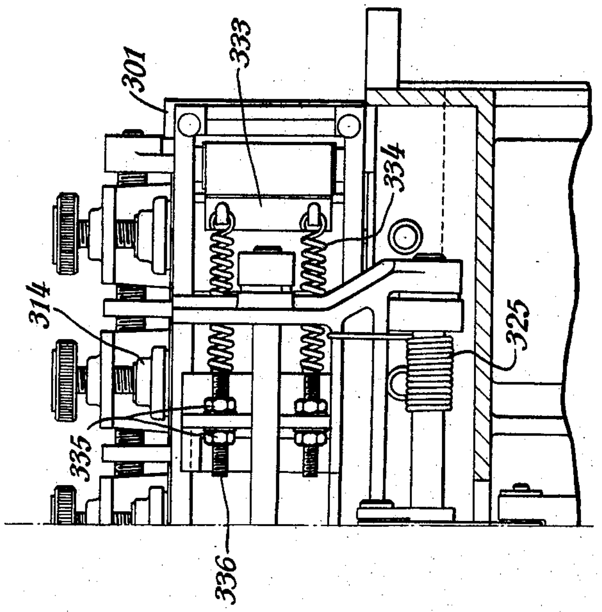
FIGURE 13 is a half plan view of the unit of FIGURE 11.
Figure 14:
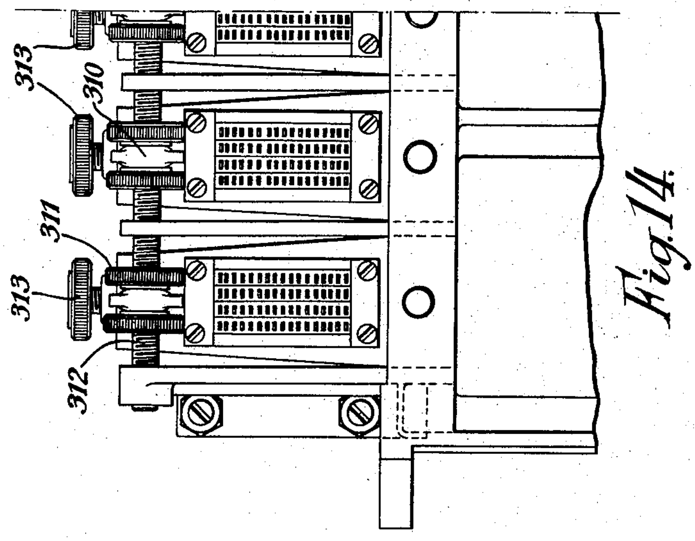
FIGURE 14 is a half inverted plan view of the unit of FIGURE 11.

In the position shown in FIGURES 11 and 12 the pressure pad member 315 has been swung downwardly into operative relation with the magnetic heads 302 to 306. In this position all the strips of soft material 324 are pressed into contact with the respective heads 302 to 306 and, owing to the fact that the ribbon 323 may slide with respect to the support portions 317 to 322, the pressure exerted by each pad 324 against the respective head is substantially the same. With a magnetic tape in position the pads 324 will, of course, press the tape into contact with all the magnetic heads with uniform pressure. If the ribbon 323 is made of high permeability magnetic material it will act as a screen to confine the magnetic fields around the magnetic heads and prevent the intrusion of outside fields.

In operation the pressure pad member 315 is normally held out of the engaged position in which it is shown in the figures by two springs 325. In this position the tape may conveniently be loaded by being laid along the line of magnetic heads 302 to 306. To bring the pressure pad member 315 into its operative position a solenoid 326 is energized to cause its operating rod 327 to move outwardly. The rod 327 acts on a push rod 328 coupled to a lever 329 which is attached to the pressure pad member 315. It may conveniently be arranged that the pressure pad member 315 is swung upwardly through an angle of about 30° for normal tape loading and unloading, but the member 315 may be moved further by hand into a portion 330 of the framework, where it is protected from accidental damage, while at the same time the member 315, the ribbon 323, the pads 324 and the magnetic heads 302 to 306 are available for inspection, cleaning, adjustment or replacement.

To regulate the pressure applied by the pads 324 the ends of the ribbon 323 have end pieces 333 attached to them, the end pieces being engaged by springs 334 adjustable for tension by means of lock nuts 335 on adjusting screws 336.

Conveniently the framework 301 is extended to form a box-like portion 331 which houses a number of panels, for example, printed circuit panels 332, in which circuitry associated with the individual elements of each magnetic head is carried.

*Electrical Arrangements and Operation*

The essential electrical and electronic equipment for the simplest type of recording is contained in the recorder housing. This includes an oscillator to provide recording bias, a second oscillator of variable frequency with a power amplifier to supply the capstan motors, which are of the synchronous variety, 16 pre-amplifiers for playback, one for each of the 16 head elements, relays and other control members.

If a signal, having sufficient amplitude and power to enable it to be applied directly to a recording head, is to be recorded by direct recording it is only necessary to connect the signal to the appropriate input terminals, mount a cassette on the recorder, set the screw in the panel 21 (FIGURE 1) to direct recording, set the screw in the panel 23 for the direction of tape traverse, set the screw in the panel 22 for the desired recording speed, check the setting of the switches 30 and start the recorder by pressing one of the buttons 28. If the button selected does not correspond with the setting of the screws in the panels 21 and 23 then pressing it will have no effect. To playback the recording the screw 21 is set to the "playback" position and, after spooling the tape back to the starting point, the recording is played back through the built-in pre-amplifier, which provides an output signal at a predetermined maximum level suitable for feeding a larger amplifier.

Where recording amplifiers are necessary, or where frequency modulation is required, or other variations in the type of recording are desired, it is necessary to use auxiliary equipment contained in separate units adapted to be connected to the recorder proper by flexible cables and plugs. This arrangement cuts down the size and weight of the recorder proper and makes it reasonably portable. The reduction in size and weight is assisted by the fact that all the electronic circuitry is transistorized.

The recording amplifiers (one for each magnetic head) are each fitted with corrector circuits to compensate for the well-known non-linearity of characteristics in tape recording. The constants of the corrector circuits must be different for each different recording speed and the circuitry is arranged so that the appropriate speed indicator lamp in the group 35 (FIGURE 1) only lights when the setting of the corrector circuits corresponds with the setting of the screws in the panel 22, so that erroneous setting is at once apparent.

The lamps in the row 31 may be connected to indicate when each individual head element is set, by means of a switch in the row 30, to a condition corresponding to the setting of the screw in the panel 21. If the switch is in the other position then the respective lamp in the row 32 lights.

Of the five magnetic heads shown in FIGURES 11 to 14, the central head 304 is an erasing head, the two adjacent heads 303 and 305 are recording heads and the outer heads 302 and 306 are playback heads. Assuming that the tape is moving from left to right a track on the tape may be erased by the central head 304, recorded by means of the head 305 and the recorded matter may be monitored immediately by means of the playback head 306. Since each head contains 16 elements this operation may be carried out on 16 tracks on the tape simultaneously. Any number of head elements less than 16 may be selected by the switches in the row 30. The erasing and recording operation can only be carried out however if the screw in the panel 21 is set to one or other of the two record positions. Otherwise, pressing the "record" button 28 has no effect. If the screw in the panel 21 is set to the playback position then the erase head 304 and the record heads 303 and 305 are inhibited, only the playback heads 302 and 306 being operative.

If the operations described above are to be carried out with the tape moving from right to left then the erasing head 304 is active, as before, but the heads 305 and 306 are not used. Instead the head 303 is the recording head and the head 302 is the monitoring head. The appropriate combination of magnetic heads is selected automatically when an appropriate button 28 is pressed. When a "fast spooling" button is pressed all the heads are inhibited.

The electronic circuitry is built up of known circuit elements to carry out the numerous different functions required in the recorder.

I claim:

1. In a magnetic tape recorder, the combination of two spools each for alternately feeding and taking up tape according to the direction in which the tape is driven, an electromagnetic friction brake for each of the spools to bring them to rest, an eddy current brake for each spool to apply a light braking torque to whichever spool is feeding tape and means for driving said spools, said means comprising for each spool, a spindle on which the spool is mounted to be rotatable therewith, a disc mounted on said spindle to be rotatable therewith, said disc having a plurality of perforations therein arranged concentrically with the axis of said spindle, an electromagnetic clutch of which the torque transmitted is proportional to the current fed thereto mounted on said spindle, a motor drivably connected to said clutch to drive said spindle through the clutch, a photoelectric device and a light source disposed to allow transmission of light from said source through said perforations as the disc rotates to produce in said device impulses whose frequency varies as the speed of the disc, an integrating circuit coupled to said photoelectric device to produce a voltage proportional to said frequency, an inverting circuit coupled to said integrating circuit to produce an output inversely proportional to said frequency, said inverting circuit being connected to said clutch to feed its output thereto to cause variation of the torque transmitted thereby, according to the speed of the disc, said electromagnetic friction brake comprising two resiliently biased brake arms disposed one each side of said disc to be moved into contact therewith against the resilient bias on actuation of said electromagnet and said eddy current brake being constituted by said disc and the electromagnet of said friction brake disposed so that on the passage through said electromagnet of a current insufficient to cause movement of said brake arms eddy currents are induced in said disc to apply a light braking torque.

2. In a magnetic tape recorder the combination as set forth in claim 1 comprising means for automatically actuating said electromagnetic friction brake on cessation of drive to said spools.

3. In a magnetic tape recorder the combination as set forth in claim 1 further comprising for each friction brake a lever, a spring acting on said lever to urge it against one of said brake arms to move that arm into contact with the disc, a solenoid and an armature for said lever, and means for maintaining the solenoid energized from the power supply to the tape recorder, said solenoid acting when energized to maintain said lever out of contact with said arm and to release it when de-energized to apply said arm to said disc so that power failure causes the spools to be automatically stopped.

4. A constant speed drive for magnetic tape or the like comprising a spool for alternately feeding and taking up tape according to the direction in which the tape is driven, means for driving said spool including a spindle on which the spool is mounted to be rotatable therewith, a disc mounted on said spindle to be rotatable therewith, said disc having a plurality of perforations therein arranged concentrically with the axis of said spindle, an electromagnetic clutch of which the torque transmitted is proportional to the current fed thereto mounted on said spindle, a motor drivably connected to said clutch to drive said spindle through the clutch, a photoelectric device and a light source disposed to allow transmission of light from said source through said perforations as the disc rotates to produce in said device impulses whose frequency varies as the speed of the disc, an integrating circuit coupled to said photoelectric device to produce a voltage proportional to said frequency, and an inverting circuit coupled to said integrating circuit to produce an output inversely proportional to said frequency, said inverting circuit being connected to said clutch to feed its output thereto to cause variation of the torque transmitted thereby, according to the speed of the disc.

5. A constant speed drive according to claim 4 comprising an electromagnetic friction brake and an eddy current brake, said disc being an element common to both said brakes and being acted upon thereby to brake said spindle.

(References on following page)

References Cited in the file of this patent

UNITED STATES PATENTS

| | | |
|---|---|---|
| 2,168,023 | Dymeck | Aug. 1, 1939 |
| 2,334,510 | Roberts | Nov. 16, 1943 |
| 2,468,198 | Heller | Apr. 26, 1949 |
| 2,469,706 | Winther | May 10, 1949 |
| 2,538,893 | Begun | Jan. 23, 1951 |
| 2,612,565 | Heller | Sept. 30, 1952 |
| 2,714,133 | Barry | July 26, 1955 |
| 2,775,407 | Elliott et al. | Dec. 25, 1956 |
| 2,895,014 | Johnson | July 14, 1959 |
| 2,933,319 | Proctor | Apr. 19, 1960 |
| 2,943,809 | Garrett | July 5, 1960 |
| 2,990,484 | Jones | June 27, 1961 |

OTHER REFERENCES

R.C.A. Review, September 1956, pages 350–375.